H. P. MILLS.
TRANSPOSING MUSICAL CHART.
APPLICATION FILED MAY 14, 1914.
1,236,339.
Patented Aug. 7, 1917.
2 SHEETS—SHEET 1.
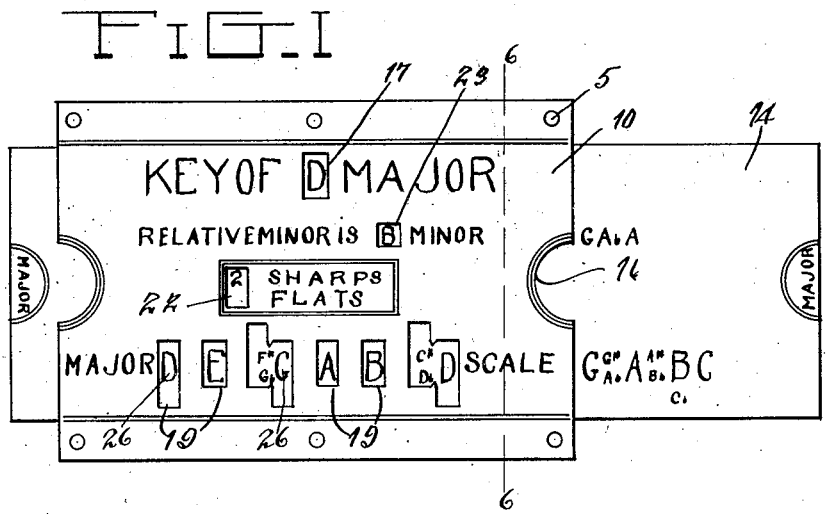
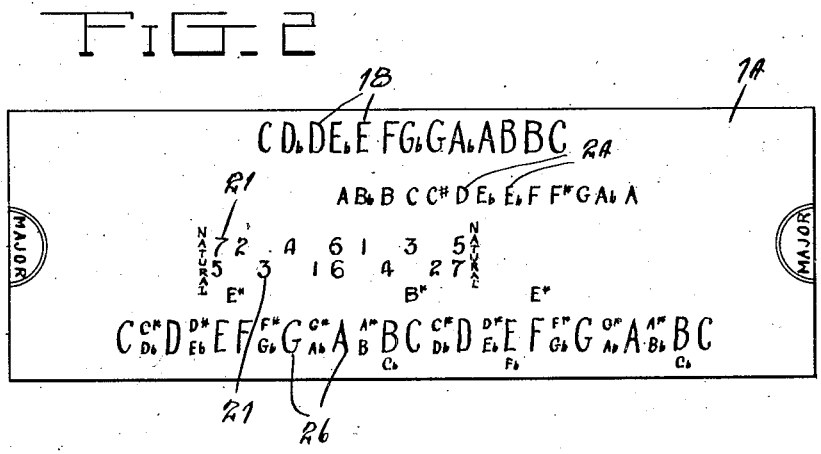
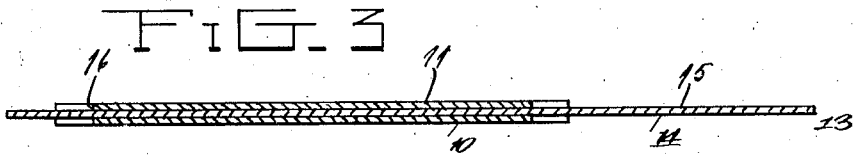
Witnesses
Inventor
H. P. Mills
By
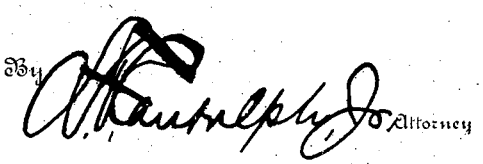
Attorney

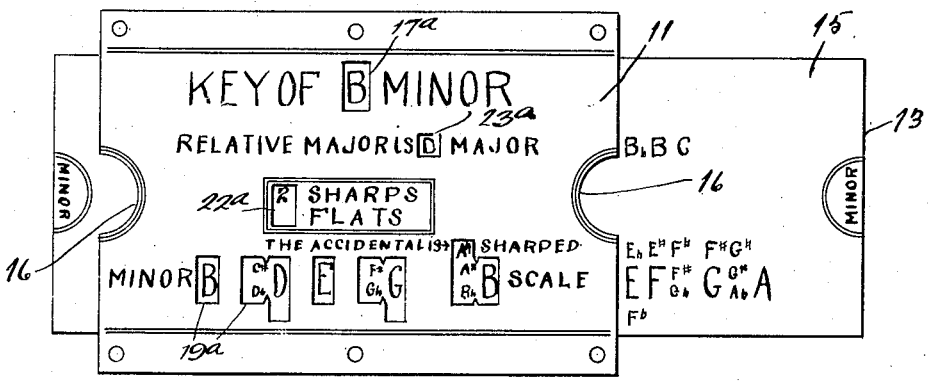

UNITED STATES PATENT OFFICE.

HARRY P. MILLS, OF PHILADELPHIA, PENNSYLVANIA.

TRANSPOSING MUSICAL CHART.

1,236,339.  Specification of Letters Patent.  Patented Aug. 7, 1917.

Application filed May 14, 1914. Serial No. 838,551.

*To all whom it may concern:*

Be it known that I, HARRY P. MILLS, a citizen of the United States, residing at Philadelphia, in the county of Philadelphia and State of Pennsylvania, have invented certain new and useful Improvements in Transposing Musical Charts, of which the following is a specification.

An object of this invention is the provision of a musical indicating device including an apertured casing and a slide adjustable therein having suitable markings representing the notes of the musical scale visible through the apertures in said casing whereby the number and names of sharps or flats in any major or minor key may be quickly and conveniently ascertained by proper adjustment of the slide within the casing.

With this and other objects in view, the invention consists in the novel construction, arrangement and combination of parts as will be hereinafter specifically described, claimed and illustrated in the accompanying drawings, in which, Figure 1 represents a front elevation of the indicator complete, Fig. 2 represents a front elevation of the slide removed, Fig. 3 represents a longitudinal sectional view through the complete indicator, Fig. 4 represents a rear elevation of the indicator, Fig. 5 represents a rear elevation of the slide removed, and, Fig. 6 represents a transverse sectional view through the indicator taken on the line 6—6 of Fig. 1.

Referring to the drawing in detail, wherein similar reference numerals designate corresponding parts throughout the several views, the numerals 10 and 11 designate the front and rear walls, respectively, of the casing of the indicator which are secured in spaced relation by suitable spacing elements 12 secured between the longitudinal edges of said walls. The wall and spacing elements 12 of the casing are preferably formed of a light durable metal or other material suitable for the purpose. A slide designated generally by the numeral 13 and formed from a sheet of material is snugly fitted within the casing and is longitudinally slidable therethrough. The slide 13 is positioned within the casing with the front face 14 thereof adjacent to the front wall 10 of the casing, and the rear face 15 thereof adjacent the rear wall 11 of the casing.

The ends of the casing are preferably notched as indicated at 16 whereby the slide 13 may be quickly and conveniently grasped by the fingers of the operator in operating the same. An opening 17 is formed through the front wall 10 of the casing at the longitudinal center and adjacent the top of the latter and by suitable adjustment of the slide 13 any one of the letters 18 printed on the front face 14 of the slide is visible through said opening. The words Key of — major are arranged suitably near the opening 17 to aid the operator in reading the indicator. Eight openings 19 are formed substantially in alinement longitudinally of the casing and adjacent the bottom thereof. The letters 26 formed adjacent the bottom of the front face of the slide 14 and representing the notes of the musical scale are adapted to be moved into registration with the openings 19 in the casing to indicate the whole scale for the key for which the slide is adjusted with notes that are to be sharped or flatted. Two rows of numbers 21 alined longitudinally of the front face 14 of the slide are visible through an opening 22 formed approximately at the center of the casing. The upper row of numerals 21 is visible through the upper portion of the opening 22 and indicates the number of sharps, if any, in any major key, while the lower row of numerals 21 indicates the number of flats, if any, in any major key. The word Natural is arranged on the right and left of the numerals 21 and appears through the opening 22 when the slide 13 is moved to the key of (C) major and indicates that there are no flats or sharps in that key. The words Sharps and Flats are arranged laterally of and adjacent the top and bottom respectively, of the opening 22 to aid the user in reading the indicator.

Intermediate the openings 17 and 22 an opening 23 is formed through the front wall 10 of the casing through which is visible any one of the letters 24 marked in longitudinal alinement on the front face 14 of the slide. The letters 24 visible through the opening 23 indicate the relative minors of any major key as indicated by the words Relative minor is, marked on the front wall 10 adjacent the opening 23.

The several rows of characters 18, 24, 21 and 26 are uniformly spaced alike. The openings 19 at the bottom expose the notes of the diatonic scale whose tonic and signature are exposed at 17 and 22, respectively.

The rear wall 11 of the casing is formed with a plurality of openings 17ª, 19ª, 22ª and 23ª corresponding to the openings 17, 19, 22 and 23 in the front wall thereof adapted to coöperate with the plurality of markings on the rear face 15 of the slide 13 to indicate to the user the number and names of any sharp or flat in any minor scale as will be understood.

The markings on the front and rear faces of the slide 13 are so arranged that any adjustment of the slide will position the key note of a major scale in registration with the opening 17 in the front face of the casing and the corresponding key note of the relative minor in registration with the opening 17ª in the rear face of the casing. The adjustment will also position in registration with the openings 22 and 22ª a numeral, which will indicate the number of sharps or flats or both, if any, in the particular key indicated by the key note visible, and will position letters in registration with the openings 19 and 19ª which will indicate the whole diatonic scale of the key for which the slide is adjusted.

What I claim is:

A transposing musical chart comprising a casing including front and rear walls, each having an opening adjacent the top edge, an opening adjacent the center, and a plurality of openings adjacent the bottom edge; a slide movable longitudinally through said casing, and carrying letters near the top edges on both the front and rear faces, said letters forming the chromatic scale and adapted to be successively moved into registration with the top openings in said casing; numerals marked on said slide and adapted to be moved into registration with said central openings and so arranged as to indicate the number of sharps or flats, if any, in the scale indicated through the top openings, said scale-indicating letters appearing in the front and rear faces of the slide being so arranged that when one letter indicating a major scale is moved into registration with the top opening in the front of said casing, the letter representing the relative minor is visible through the top opening in the rear wall of casing; and note-designating characters on the front and rear faces adjacent the bottom of said slide adapted to be moved into registration with the openings adjacent the bottom of said casing for indicating the notes of the diatonic scales whose tonics are exposed through the top openings in said casing; the plurality of letters indicating the major or minor scale on the slide adjacent the top thereof, the numerals on the slide indicating the number of sharps or flats, and the note designating characters adjacent the bottom of the slide being uniformly spaced alike on the slide, as and for the purpose specified.

In testimony whereof I affix my signature in presence of two witnesses.

HARRY P. MILLS.

Witnesses:
J. H. McCullough,
Harold M. Kunz.